(12) United States Patent
Jia et al.

(10) Patent No.: US 7,103,325 B1
(45) Date of Patent: Sep. 5, 2006

(54) ADAPTIVE MODULATION AND CODING

(75) Inventors: Ming Jia, Ottawa (CA); Jianglei Ma, Kanata (CA); Peiying Zhu, Kanata (CA); Dong-Sheng Yu, Ottawa (CA); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 576 days.

(21) Appl. No.: 10/116,896

(22) Filed: Apr. 5, 2002

(51) Int. Cl.
*H04Q 1/20* (2006.01)
*H04B 7/02* (2006.01)

(52) U.S. Cl. ............ 455/101; 455/102; 455/106; 455/107; 455/115.1; 455/115.3; 375/219; 375/267; 375/347; 370/329

(58) Field of Classification Search .......... 455/92, 455/115, 501, 406, 422, 518–519, 132–140, 455/19, 25, 550, 504, 506, 513, 115.1, 101, 455/62, 63.1, 63.4, 62.11, 67.14, 102–103, 455/106–108, 110–111, 114.2, 115.3; 375/267, 375/299, 347–349, 144–148, 260, 297, 219; 370/310, 329–334, 342, 208; 342/375, 357.12, 342/383
See application file for complete search history.

(56) References Cited

U.S. PATENT DOCUMENTS

| | | | | |
|---|---|---|---|---|
| 6,128,276 | A | 10/2000 | Agee | 370/208 |
| 6,298,092 | B1 | 10/2001 | Heath, Jr. et al. | 375/267 |
| 6,314,289 | B1 | 11/2001 | Eberlein et al. | 455/427 |
| 6,351,499 | B1* | 2/2002 | Paulraj et al. | 375/267 |
| 6,560,209 | B1 | 5/2003 | Alamouti et al. | 370/330 |
| 6,560,295 | B1* | 5/2003 | Hammons et al. | 375/299 |
| 6,587,526 | B1 | 7/2003 | Li et al. | 375/355 |
| 6,687,492 | B1* | 2/2004 | Sugar et al. | 455/276.1 |
| 6,771,706 | B1* | 8/2004 | Ling et al. | 375/267 |
| 6,785,341 | B1* | 8/2004 | Walton et al. | 375/267 |
| 6,828,935 | B1* | 12/2004 | Dunn et al. | 342/375 |
| 6,862,271 | B1* | 3/2005 | Medvedev et al. | 370/329 |
| 2001/0041556 | A1* | 11/2001 | Laursen et al. | 455/406 |
| 2002/0044611 | A1* | 4/2002 | Hassibi et al. | 375/267 |
| 2002/0085643 | A1* | 7/2002 | Kitchener | 375/267 |
| 2002/0150065 | A1* | 10/2002 | Ponnekanti | 370/334 |
| 2002/0186779 | A1* | 12/2002 | Gollamudi | 375/267 |
| 2003/0003863 | A1* | 1/2003 | Thielecke et al. | 455/39 |

(Continued)

FOREIGN PATENT DOCUMENTS

EP 1037303 A1 9/2000

(Continued)

OTHER PUBLICATIONS

Bevan et al., "Space-Time Coding for Capacity Enhancement in Future-Generation Wireless Communications Networks," IEE Colloquium on Capacity and Range Enhancement Techniques for the Third Generation Mobile Communications and Beyond, IEE, London, GB, Feb. 11, 2000, pp. 8-1 to 8-11, XP001020950.

(Continued)

*Primary Examiner*—Pablo N. Tran
(74) *Attorney, Agent, or Firm*—Withrow & Terranova, PLLC

(57) ABSTRACT

The present invention selects a space-time encoding mode to use when transmitting with spatial diversity based on the receive diversity associated with a receiver device and the quality of the transmission channels based on information fed back from the receiver device. The selectable space-time encoding modes are preferably space-time transmit diversity encoding and a version of BLAST-type encoding. Further, modulation modes, error encoding rates, or a combination thereof, may also be based on the quality of the transmission channels and the available diversity of the receiver device.

33 Claims, 7 Drawing Sheets

U.S. PATENT DOCUMENTS

| | | | |
|---|---|---|---|
| 2003/0003880 A1* | 1/2003 | Ling et al. | 455/92 |
| 2003/0035490 A1* | 2/2003 | Gollamudi | 375/267 |
| 2003/0190897 A1* | 10/2003 | Lei et al. | 455/101 |
| 2003/0231706 A1* | 12/2003 | Hwang | 375/219 |
| 2004/0001429 A1* | 1/2004 | Ma et al. | 370/210 |
| 2004/0052315 A1* | 3/2004 | Thielecke et al. | 375/299 |
| 2004/0066866 A1* | 4/2004 | Tong et al. | 375/347 |

FOREIGN PATENT DOCUMENTS

| | | |
|---|---|---|
| WO | 98/09381 | 3/1998 |
| WO | 99/14871 | 3/1999 |
| WO | WO 01/45300 A1 | 6/2001 |

OTHER PUBLICATIONS

Lee, Hyeon et al., "Performance Analysis of Down Link Time Switched Transmit Diversity (TSTD) in W-CSMA System," IEEE 51st Vehicular Technology Conference Proceedings, Tokyo, Spring 2000, 0-7803-5718-3.

Li, Ye (Geoffrey) et al., "Transmitter Diversity for OFDM System and Its Impact on High-Rate Wireless Networks," IEEE International Conference on Communications, 1999, 0-7803-5284-X.

* cited by examiner 2 x 2 MIMO (2 TRANSMITTER x 2 RECEIVERS)

| CQI | 1 | 2 | 3 | 4 | 5 | 6 | | 7 | | 8 | | 9 | | 10 | |
|---|---|---|---|---|---|---|---|---|---|---|---|---|---|---|---|
| CEI | N/A | N/A | N/A | N/A | N/A | HIGH | LOW | HIGH | LOW | HIGH | LOW | HIGH | LOW | HIGH | LOW |
| CODING RATE | 1/5 | 1/3 | 1/2 | 2/3 | 4/5 | 1/2 | 1/2 | 2/3 | 2/3 | 4/5 | 4/5 | 1/2 | 1/2 | 2/3 | 2/3 |
| MODULATION MAPPING | 4 QAM | 4 QAM | 4 QAM | 4 QAM | 4 QAM | 4 QAM | 16 QAM | 4 QAM | 16 QAM | 4 QAM | 16 QAM | 16 QAM | 64 QAM | 16 QAM | 16 QAM |
| STC CODING | STTD | STTD | STTD | STTD | STTD | BLAST | STTD | BLAST | STTD | BLAST | STTD | BLAST | STTD | BLAST | STTD |

FIG. 6

2 x 4 MIMO (2 TRANSMITTER x 4 RECEIVERS)

| CQI | 1 | 2 | 3 | 4 | 5 | 6 | 7 | 8 | 9 | 10 |
|---|---|---|---|---|---|---|---|---|---|---|
| CEI | N/A | N/A | N/A | N/A | N/A | N/A | N/A | N/A | N/A | N/A |
| CODING RATE | 1/5 | 1/3 | 1/2 | 2/3 | 4/5 | 1/2 | 2/3 | 4/5 | 1/2 | 2/3 |
| MODULATION MAPPING | 4 QAM | 4 QAM | 4 QAM | 4 QAM | 4 QAM | 4 QAM | 4 QAM | 4 QAM | 16 QAM | 16 QAM |
| STC CODING | STTD | STTD | STTD | STTD | STTD | BLAST | BLAST | BLAST | BLAST | BLAST |

*FIG. 7*

ADAPTIVE MODULATION AND CODING

FIELD OF THE INVENTION

The present invention relates to wireless communications, and in particular to adaptively controlling coding and modulation techniques in a wireless communication system incorporating space-time coding.

BACKGROUND OF THE INVENTION

Interference and fading are significant impediments to achieving high data rates in today's wireless communication systems. Given the tendency for channel conditions to sporadically and significantly fade, communication resources are conservatively allocated, leaving excessive amounts of communication resources unused most of the time. Efforts to combat the impact of fading include incorporating transmission diversity or controlling modulation and coding techniques in relation to channel conditions.

Spatial diversity is typically a function of the number and placement of transmit and receive antennas relative to a transmitter and receiver. Systems employing spatial diversity with multiple transmit and receive antennas are generally referred to as multiple-input multiple-output (MIMO) systems. Accordingly, a transmitting device will have N transmit antennas, and the receiving device will have M receive antennas. Space-time coding controls what data is transmitted from each of the N transmit antennas. A space-time encoding function at the transmitter processes data to be transmitted and creates unique information to transmit from the N transmit antennas. Each of the M receive antennas will receive signals transmitted from each of the N transmit antennas. A space-time decoding function at the receiving device will combine the information sent from the N transmit antennas to recover the data.

Space-time encoding is typically implemented using one of two techniques. The first technique encodes the same data in different formats for transmission from the different transmit antennas. Thus, the same data is transmitted in different formats from each of the N transmit antennas. The second technique transmits different data from different ones of the N transmit antennas wherein the redundancy of the second technique is avoided. The first technique, which is often referred to as space-time transmit diversity (STTD), is effective in maximizing diversity but inefficient due to the requisite redundancy. The second technique, which is often referred to as V-BLAST (Vertical—Bell Laboratories Layered Space Time), increases system throughput for systems having sufficient diversity available. Once a threshold amount of diversity is achieved, data rates increase linearly with the number of transmit and receive antennas for BLAST systems, whereas additional spatial diversity has little impact on data rates in STTD systems. Thus, STTD and BLAST systems have unique advantages and disadvantages. Historically, STTD and BLAST spatial encoding techniques have not been employed in the same system. Further information related to STTD and V-BLAST can be found in Siavash M. Alamouti, "A Simple Transmit Diversity Technique for Wireless Communications," *IEEE J. Select. Areas Commun.*, vol. 16, pp. 1451–1458, Oct. 1998; G. J. Foschini, "Layered Space-time Architecture for Wireless Communications in a Fading Environment when Using Multi-element antennas," Bell Labs Tech. J., pp. 41–59, Autumn 1996; G. D. Golden, G. J. Foschini, R. A. Valenzuela, and P. W. Wolniansky, "Detection Algorithm and Initial Laboratory Results Using V-BLAST Space-time Communication Architecture," Electronics Letters, vol. 35, pp 14–16, January 1999; and P. W. Wolniansky, G. J., Foschini, G. D. Golden, and R. A. Valenzuela, "V-BLAST: An Architecture for Realizing Very High Data Rates Over the Rich-scattering Wireless Channel," Proc. *IEEE ISSSE*-98, Pisa, Italy, September 1998, pp. 295–300, which are incorporated herein by reference.

Prior to space-time coding, data to be transmitted is encoded to facilitate error correction and modulated or mapped into symbols using any number of available modulation techniques, such as quadrature phase shift keying (QPSK) and x-quadrature amplitude modulation (QAM). The type of encoding for error correction and modulation techniques greatly influences the data rates, and their applicability is a function of channel conditions.

Since STTD and BLAST space-time coding techniques are not traditionally combined, many systems are unable to take full advantage of available resources even when error encoding and modulation techniques are controlled based on channel conditions. Over time, the optimal space-coding technique in a communication environment is likely to change between STTD and BLAST. Further, for either STTD or BLAST space-time coding, the optimal type of error encoding or modulation techniques will also change over time. As such, there is a need to adaptively control space-time coding, error rate encoding, and modulation techniques to optimize communication efficiency between communicating devices over varying channel conditions.

SUMMARY OF THE INVENTION

The present invention selects a space-time encoding mode to use when transmitting with spatial diversity based on the receive diversity associated with a receiver device and the quality of the transmission channels based on information fed back from the receiver device. The selectable space-time encoding modes are preferably space-time transmit diversity encoding and a version of BLAST-type encoding. Further, modulation modes, error encoding rates, or a combination thereof, may also be based on the quality of the transmission channels and the available diversity of the receiver device. Information bearing in the correlation, or balance, of the various transmission channels can also be fed back to the transmitter from the receiver device to assist in the selection of modulation modes and error encoding rates.

During operation, the transmitter continuously monitors the quality of channel conditions, and based on the diversity of the receiver device, will dynamically select the space-time encoding mode, modulation mode, and error correction encoding most appropriate for current conditions. The present invention is applicable in a wide variety of wireless communication environments in both uplink and downlink modes. As such, both base stations and mobile terminals can take advantage of the adaptive modulation and coding of the present invention.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 6 is a table illustrating an adaptive modulation and coding matrix for a communication link having two transmitters and two receivers.

FIG. 7 is a table illustrating an adaptive modulation and coding matrix for a communication link having two transmitters and four receivers.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In a system employing spatial diversity, the present invention adaptively controls coding and modulation techniques for transmission based on available spatial diversity and the quality of the channel or channels used for transmission. The coding and modulation techniques are dynamically selected to minimize error rates and maximize data rates. In one embodiment, the number of available receive antennas and a channel quality indicator are used to determine a space-time coding mode and a modulation technique to use for transmission. Typically, an error coding rate is associated with the transmission technique and the available modulation technique. As will be discussed in greater detail below, other factors, such as cross correlation relationships among the diverse channels, may influence coding and modulation selections. The following description initiates with an overview of a wireless communication environment and the architecture of a base station, or like access point, and a mobile terminal.

Figure 1:
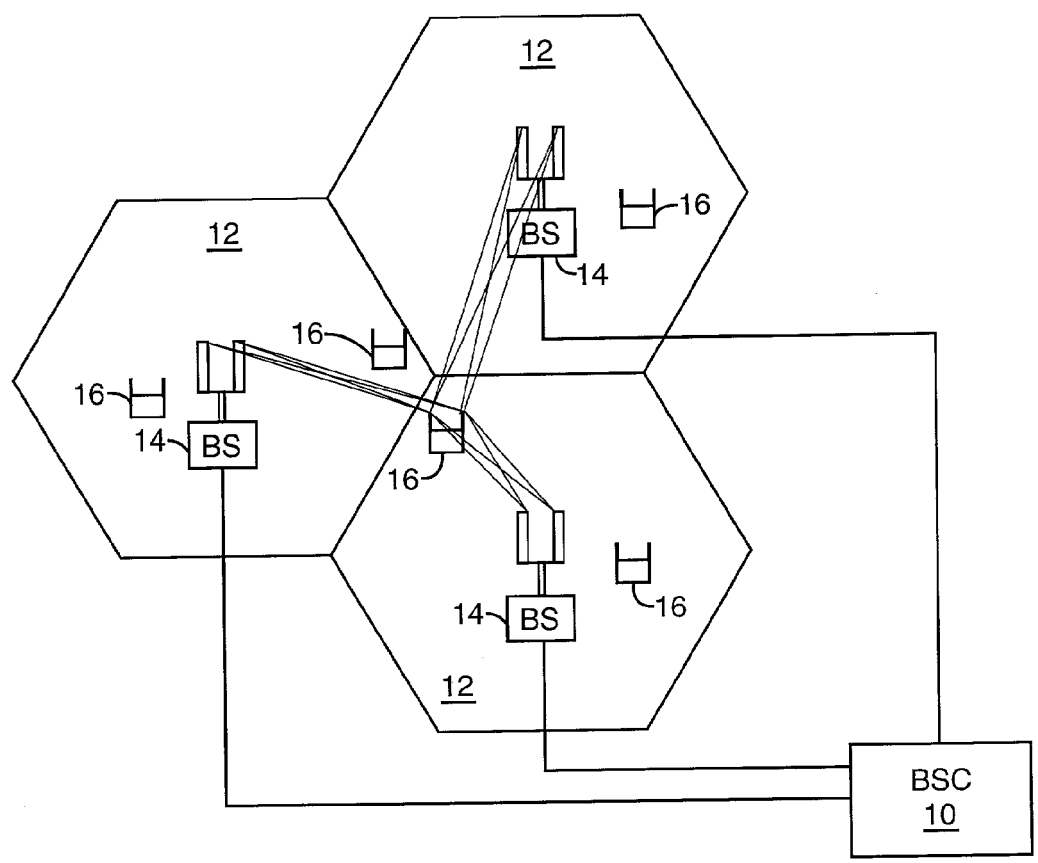
FIG. 1 is a block representation of a cellular communication system.

With reference to FIG. 1, a base station controller (BSC) 10 controls wireless communications within multiple cells 12, which are served by corresponding base stations (BS) 14. In general, each base station 14 facilitates communications with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 include multiple antennas to provide spatial diversity for communications.

Figure 2:
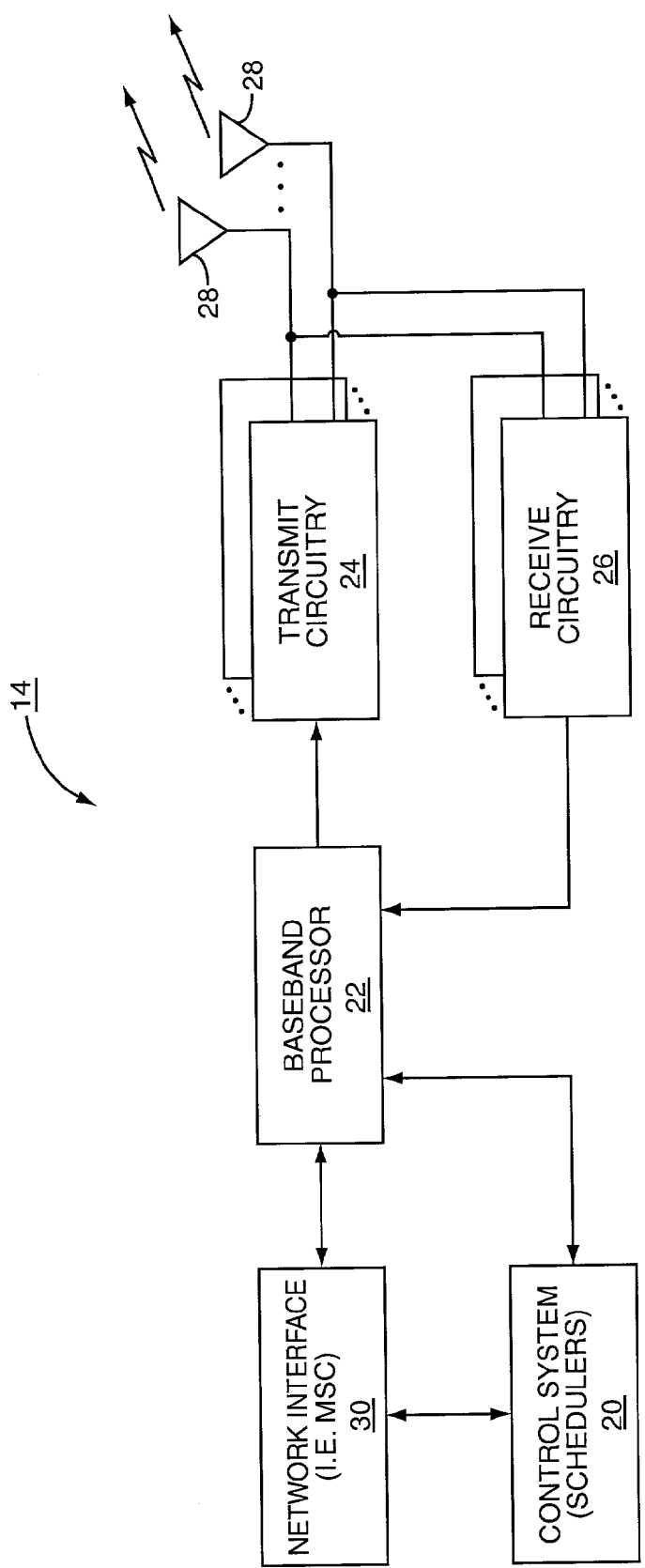
FIG. 2 is a block representation of a base station according to one embodiment of the present invention.

A high level overview of the mobile terminals 16 and base stations 14 of the present invention is provided prior to delving into the structural and functional details of the preferred embodiments. With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by mobile terminals 16 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 3:
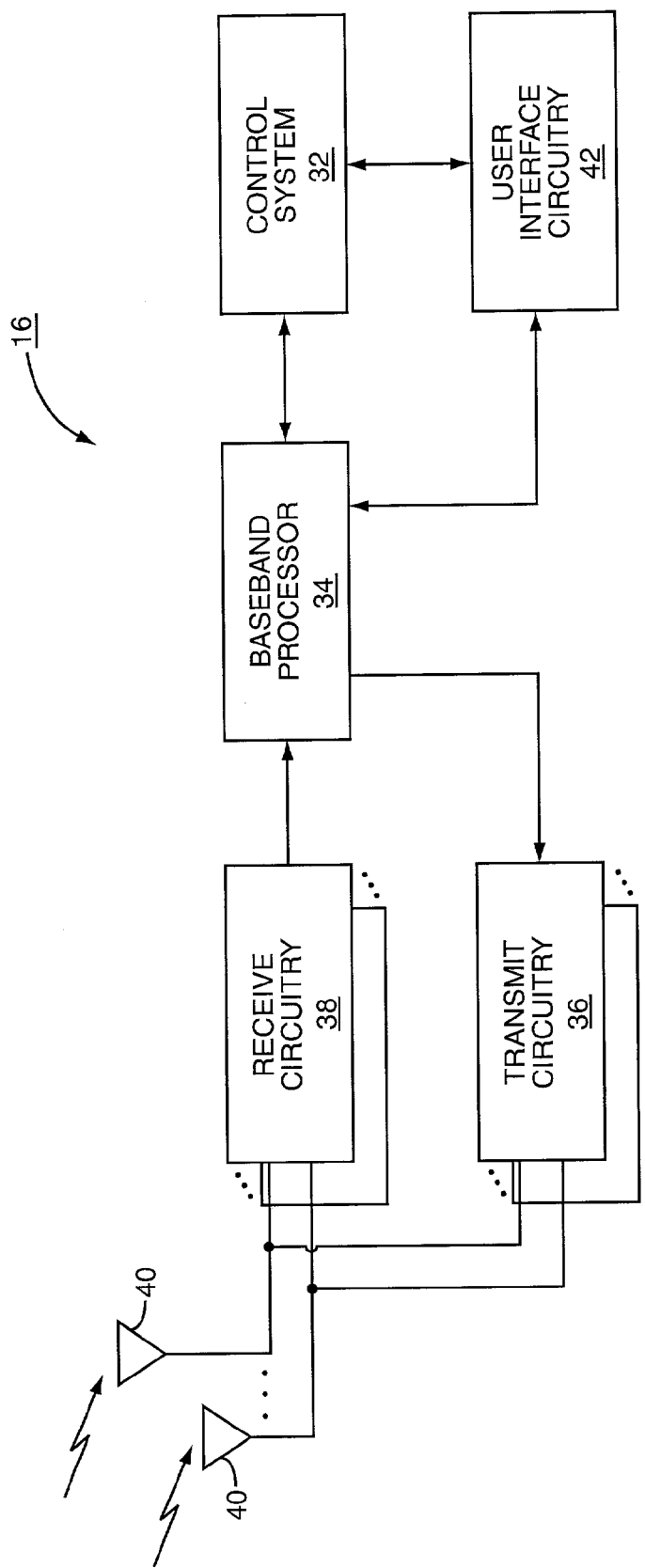
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 4:
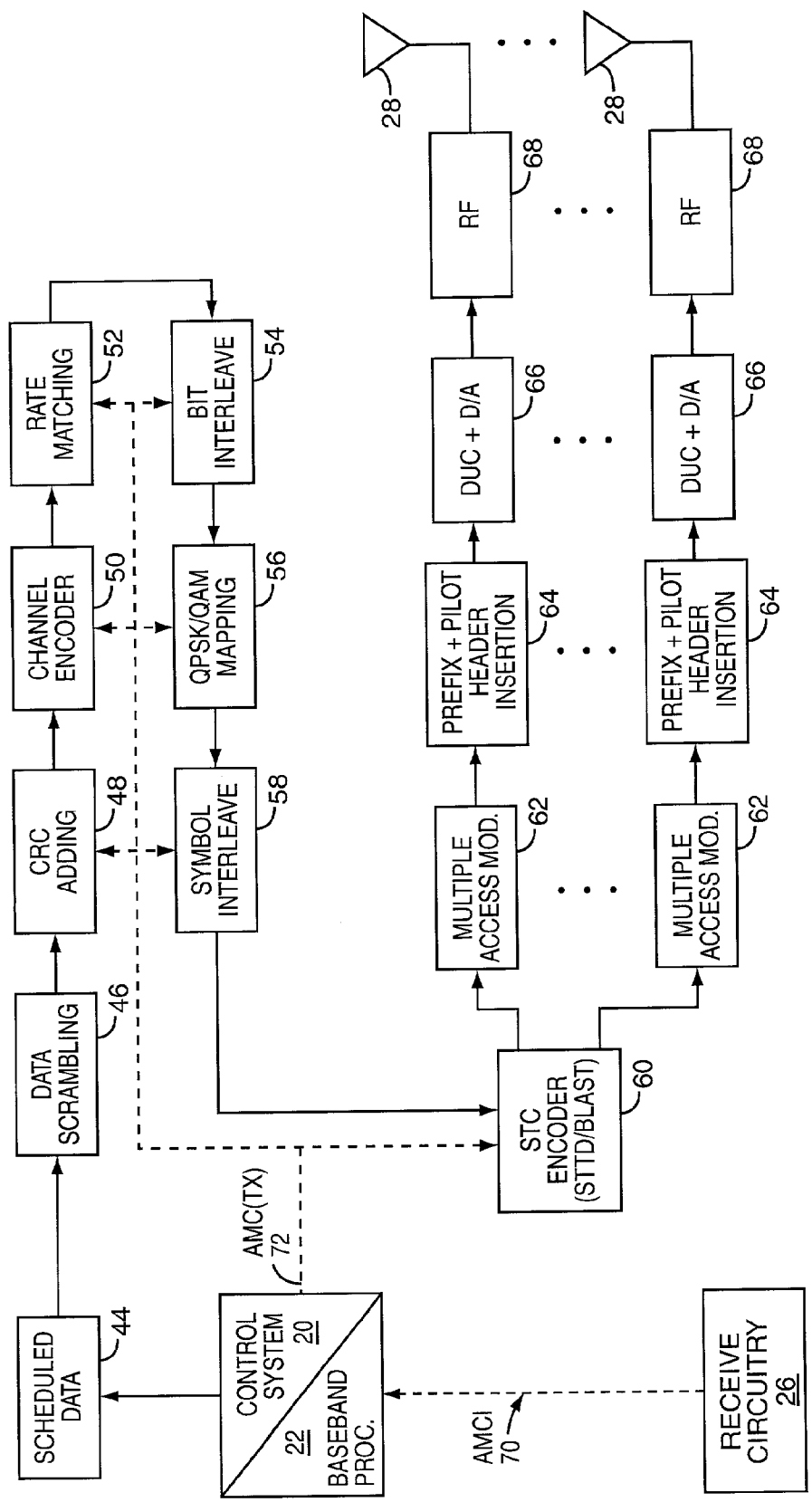
FIG. 4 is a logical breakdown of a transmitter architecture according to one embodiment of the present invention.

With reference to FIG. 4, a logical transmission architecture is provided according to one embodiment. The transmission architecture is described as being that of the base station 14, but those skilled in the art will recognize the applicability of the illustrated architecture for uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the base station controller 10 sends data 44 intended for a mobile terminal 16 to the base station 14 for scheduling. The scheduled data, which is a stream of bits, is scrambled in a manner reducing the peak-to-average power ratio associated with the data using data scrambling logic 46. A cyclic redundancy check (CRC) for the scrambled data is determined and appended to the scrambled data using CRC logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time block code (STC) encoder logic 60, which modifies the symbols in a fashion making the transmitted signals more resistant to interference and readily decoded at a mobile terminal 16. The STC encoder logic 60 will process the incoming symbols according to a selected STC encoding mode and provide n outputs corresponding to the number of transmit antennas 28 for the base station 14. Further detail regarding the STC encoding is provided later in the description. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803–1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding multiple access modulation function 62, illustrated separately for ease of understanding. Those skilled in the art will recognize that one or more processors may be used to provide such analog or digital signal processing alone or in combination with other processing described herein. For example, the multiple access modulation function 62 in a CDMA function would provide the requisite PN code multiplication, wherein an OFDM function would operate on the respective symbols using IDFT or like processing to effect an Inverse Fourier Transform. Attention is drawn to co-assigned application Ser. No. 10/104,399, filed Mar. 22, 2002, entitled SOFT HANDOFF FOR OFDM, for additional OFDM details and to RF Microelectronics by Behzad Razavi, 1998 for CDMA and other multiple access technologies, both of which are incorporated herein by reference in their entirety.

The resultant symbols are grouped into frames, which are associated with prefix and pilot headers by like insertion logic 64 (in an OFDM-type system). Each of the resultant signals is up-converted in the digital domain to an intermediate frequency and converted to an analog signal via the corresponding digital up-conversion (DUC) and digital-to-analog (D/A) conversion circuitry 66. The resultant analog signals are then simultaneously modulated at the desired RF frequency, amplified, and transmitted via the RF circuitry 68 and antennas 28. Notably, the transmitted data is preceded by pilot signals, which are known by the intended mobile terminal 16. The mobile terminal 16, which is discussed in detail below, may use the pilot signals for channel estimation and interference suppression and the header for identification of the base station 14.

During transmission, the control system 20 and/or baseband processor 22 will provide adaptive modulation and coding and select a desired STC encoding technique based on adaptive modulation and coding indicia (AMCI) 70 fed back from the base station 14. Accordingly, the AMCI 70 transmitted from the base station 14 is recovered via the receive circuitry 26 and processed by the baseband processor 22 and/or the control system 20 to generate one or more adaptive modulation and coding (AMC (TX)) signals 72 for selecting error coding rates, modulation techniques and STC modes. In one embodiment, the AMCI 70 fed back from the base station 14 includes a channel quality indicia (CQI), and perhaps cross correlation indicia bearing on the balance or correlation of each of the diverse channels. If the base station 14 is not aware of the number of receive antennas 40 used by the mobile terminal 16, such information is provided in the AMCI 70.

Based on the CQI, the number of receive antennas 40 at the mobile terminal 16, and the AMC (TX) 72, the control system 20 will determine a STC mode for the STC encoder 60 an error coding and modulation set. In the preferred embodiment, the STC encoding may be either space-time-transmit diversity (STTD) or V-BLAST-type coding. STTD coding encodes data into multiple formats and simultaneously transmits the multiple formats with spatial diversity from the corresponding antennas 28. V-BLAST coding separates data into different groups and separately encodes and transmits each group from different ones of the antennas 28.

Typically, error coding and modulation techniques are related and require cooperation from various functions throughout the data path. In the illustrated embodiment the AMC (TX) signal(s) 72 controls the CRC adding function 48, sets a code rate to use by the channel encoder 50, and informs the rate matching function 52 and the bit interleave function 54 of the selected code rate. The AMC (TX) signal(s) 72 will also control a mapping of the data into symbols according to the selected modulation technique with modulation provided by the QPSK/QAM mapping function 56. Further, the AMC (TX) signal(s) 72 may also inform the symbol interleave function 58 of the selected modulation technique. The selection and relationship of the STC encoding to the modulation and error coding techniques is discussed after a description of the architecture of the mobile terminal.

Figure 5:
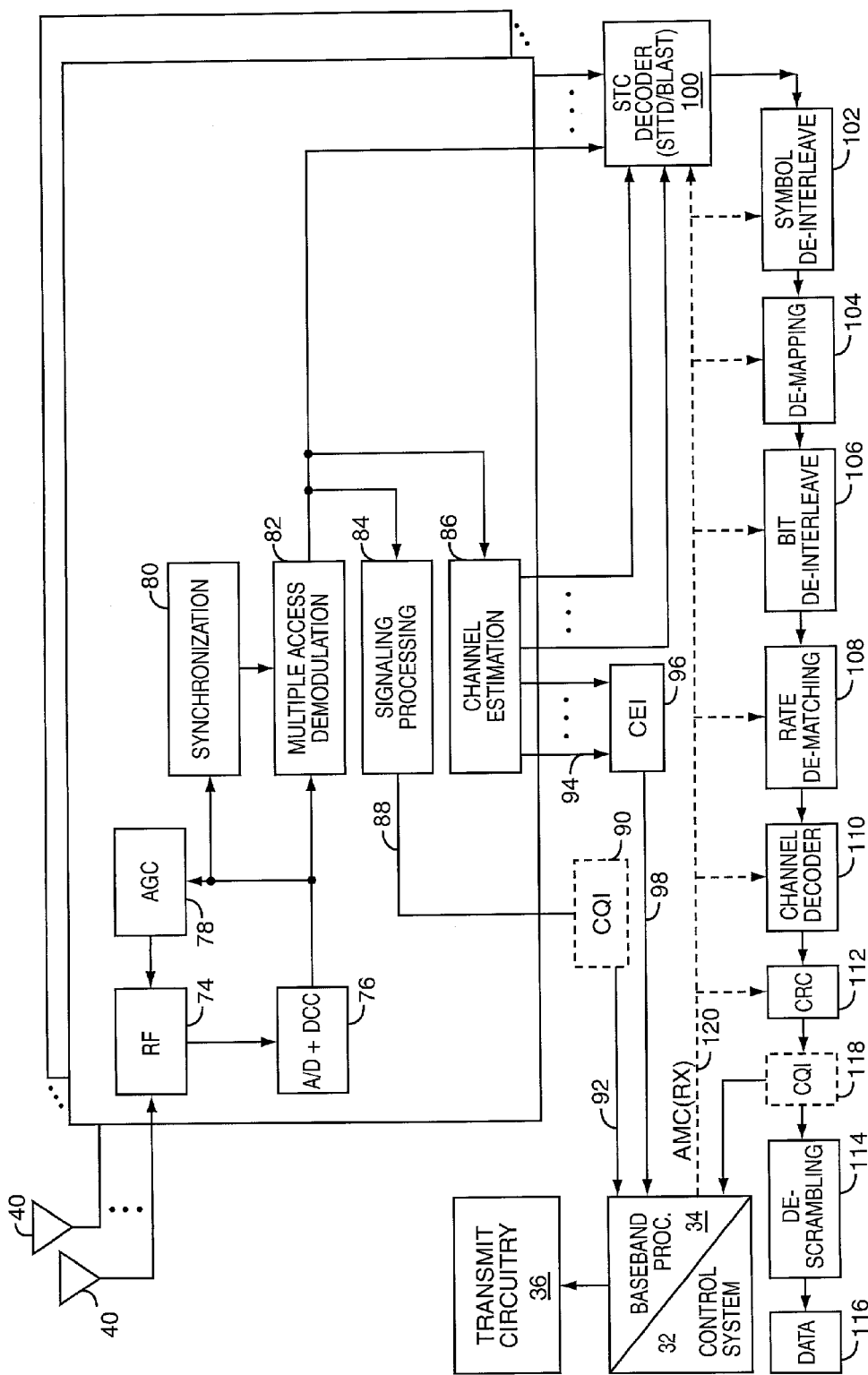
FIG. 5 is a logical breakdown of a receiver architecture according to one embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 74. For the sake of conciseness and clarity, only one of the multiple receive paths in the receiver is described and illustrated in detail. Analog-to-digital (A/D) converter and down-conversion circuitry (DCC) 76 digitizes and downconverts the analog signal for digital processing. The resultant digitized signal may be used by automatic gain control circuitry (AGC) 78 to control the gain of the amplifiers in the RF circuitry 70 based on the received signal level.

The digitized signal is also fed to synchronization circuitry 80 and a multiple access demodulation function 82, which will recover the incoming signal received at a corresponding antenna 40 at each receiver path. The synchronization circuitry 80 facilitates alignment or correlation of the incoming signal with the multiple access demodulation function 82 to aid recovery of the incoming signal, which is provided to a signaling processing function 84 and channel estimation function 86. The signal processing function 84 processes basic signaling and header information to provide information (88) sufficient to generate a channel quality measurement from a CQI function 90. Preferably, the CQI function bears on an overall signal-to-noise ratio for the link, which takes into account channel conditions and/or signal-to-noise ratios for each receive path.

As such, the CQI function 90 gathers and processes the information (88) from the signaling processing function 84 for each receive path and provides CQI information 92 to the baseband processor 34 for forwarding to the base station 14. The CQI information is or forms part of the AMCI 70, which is used by the base station 14 to determine the AMC (TX) 72, which controls STC encoding selection and the coding and modulation set. The CQI information 92 may be fully processed by the CQI function 90 or may be sent in a raw data form for processing at the base station 14. The key is providing the base station 14 with CQI information 92 representing or sufficient to determine channel quality.

The channel estimation function 86 for each receive path provides channel responses corresponding to channel conditions for use by the STC decoder 100 and provides a channel matrix 94 to a channel eigenvalue indicia (CEI) function 96, which may generate a CEI value 98. The channel matrix 94, which is discussed in greater detail later on in this specification, is a matrix containing the channel responses between every pair of transmit and receive antennas. As with the CQI information 92, the CEI value 98 (or like channel correlation information) may be calculated at the mobile terminal 16 or the base station 14. Thus, either a CEI value 98 or information sufficient to create a CEI value is sent to the baseband processor 34 to forward to the base station 14 via the transmit circuitry 36 of the mobile terminal 16.

The symbols from the incoming signal and channel estimates for each receive path are provided to an STC decoder 100, which provides STC decoding on both received paths to recover the transmitted symbols. The channel estimates provide sufficient channel response information to allow the STC decoder 100 to decode the symbols according to the STC encoding used by the base station 14.

The recovered symbols are placed back in order using the symbol de-interleaver logic 102, which corresponds to the symbol interleaver logic 58 of the base station 14. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

To synchronize the STC mode, error coding, and modulation techniques between the mobile terminal 16 (receiver) and base station 14 (transmitter), the base station 14 will provide appropriate control signaling to the mobile terminal 16. The mobile terminal 16 will respond to the information by providing an adaptive modulation and coding (AMC (RX)) signal or signals 120 to control decoding and demodulation. Accordingly, the AMC (RX) signal(s) 120 are used to select an STC mode for the STC encoder 60 as well as an appropriate error decoding and demodulation set.

A CQI value may be determined based on the recovered data. An additional or alternative CQI function 118 may be provided anywhere along the data recovery path (blocks 102 through 116) to monitor signal-to-noise ratios, error rates, and like to derive information bearing on individual or overall channel quality. Additional information on one exemplary way to determine a CQI value is provided in co-assigned application Ser. No. 60/329,511, filed Oct. 17, 2001, and entitled "METHOD AND APPARATUS FOR CHANNEL QUALITY MEASUREMENT FOR ADAPTIVE MODULATION AND CODING."

In the preferred embodiment, the AMC (RX) signal(s) 120 also control the CRC function 112, set a decoding rate to use by the channel decoder 110, and inform the rate de-matching function 108 and the bit de-interleave function 106 of the selected code rate. The AMC (RX) signal(s) 120 will also control de-mapping of symbols into data according to the selected modulation technique. Further, the AMC (RX) signal(s) 120 may also inform the symbol de-interleave function 102 of the selected modulation technique.

The following describes the overall functionality of the present invention and refers to the primary device used for transmission as the transmitter and the device used for receiving as the receiver. At any given time depending on the direction of primary communications, the base station 14 and the mobile terminals 16 may be either a transmitter, receiver, or both. Based on the number of receive antennas, the CQI value 92, and perhaps the CEI value 98, the transmitter dynamically selects an STC mode and a coding and modulation set. Preferably, at least the CQI value 92, and if desired, the CEI parameters 98 are continuously measured and sent from the receiver to the transmitter to allow the transmitter to adjust transmission parameters to track channel conditions associated with the given receiver. Notably, the number of receive antennas used by the receiver may be stored by the transmitter or may be repeatedly provided along with the CQI value 92.

As an example, the following logic may be applied. If there is only one antenna at the receiver, STTD-type STC coding is selected and the coding and modulation is selected in the CQI value 92. If there are two receive antennas, STC coding is selected based on CQI and CEI values 92, 98. The table of FIG. 6 illustrates an exemplary configuration set when two receive antennas are available. The CQI values 92 are normalized from one to ten with channel quality increasing with increasing CQI values 92. For CQI values 92 of five or less, the STC coding mode is set for STTD and 4-QAM is selected. The variable for CQI values 92 of five or less is the error encoding, which is Turbo encoding in this example. As the CQI values 92 increase from one to five, the Turbo encoding rates increase as follows: 1/5, 1/3, 1/2, 2/3, and 4/5. Further, CEI values 98 do not affect the decision.

For CQI values 92 from six to ten, CEI values 98 are categorized as either having high or low correlation indexes. The higher the correlation, the more balance the respective transmission channels and less benefit provided by diversity. As such, low values trigger a selection of STTD-type STC encoding wherein high values trigger V-BLAST-type STC encoding. As illustrated, the coding rates and modulation techniques tend to increase with channel quality wherein the modulation techniques are also a function of the CEI value 98. In general, data rates increase with CQI 92, and with all other parameters equal, BLAST-type STC coding provides significantly higher data rates that STTD-type STC coding because of the redundancy associated with the latter.

In the preferred embodiment, decisions for receivers with more than two receive antennas are not a function of CEI values 98, because of the significant diversity associated with having the additional receive antennas. As such, the number of receive antennas and the CQI value 92 have proven sufficient to select the STC encoding and the code and modulation set. The table in FIG. 7 illustrates an exemplary configuration set for a receiver having four receive antennas.

For CQI values 92 of five or less, the STC coding mode is set for STTD and 4-QAM is selected. The variable for CQI values 92 of five or less is the error coding, which is Turbo coding for this example. As the CQI values 92 increase from one to five, the Turbo coding rates increase as follows: 1/5, 1/3, 1/2, 2/3, and 4/5. For CQI values 92 from six to ten, V-BLAST-type STC encoding is selected. As illustrated, the coding rates and modulation techniques tend to increase with channel quality.

Consider a wireless system comprising $N_t$ transmit and $N_r$ receive antennas, and let H be a $N_r \times N_t$ complex propagation channel matrix used to determine a CEI 98 in one embodiment of the present invention. If the channel matrix H is known at the receiver, the Shannon capacity for a BLAST system is given by:

$$C = \log_2 \det\left(I_{N_r} + \frac{\rho}{N_t} HH^*\right) \text{ bps/Hz} \quad (1)$$

where $\rho$ is the signal-to-noise ratio (SNR) per receive antenna. Further reference is made to G. J. Foschini and M. J. Gans, "On Limits of Wireless Communications in a Fading Environment when Using Multiple Antennas," *Wireless Personal Communications*, vol. 6, pp. 311–335, March 1998, which is incorporated herein by reference.

If $N_r = N_t = N$, then by the law of large numbers, $$\frac{HH^*}{N} = I_N$$

as N increases. Accordingly, the capacity for large N values is asymptotic to $$C = N\log_2(1+\rho)\text{bps/Hz}. \quad (2)$$

From Equation (2), it can be seen that for high signal-to-noise ratios (SNRs) and $N_r = N_t = N$, the scaling of the capacity is likely N more bps/Hz for every 3 dB SNR improvement. The throughput of BLAST is detection algorithm dependent. For MMSE (minimum mean-squared error) and ZF (zero forcing) algorithms, which are widely used in multi-user detection, the diversity order is limited to $N_r - N_t + 1$. Further reference is made to J. H. Winters, J. Salz and R. D. Gitlin, "The Impact of Antenna Diversity on the Capacity of Wireless Communication Systems," *IEEE Trans. on Communications*, vol. 42, pp. 1740–1751, February/March/April 1994; G. D. Golden, G. J. Foschini, R. A. Valenzuela, and P. W. Wolniansky, "Detection Algorithm and Initial Laboratory Results Using V-BLAST Space-time Communication Architecture," *Electronics Letters*, vol. 35, pp 14–16, January 1999; and P. W. Wolniansky, G. J., Foschini, G. D. Golden, and R. A. Valenzuela, "V-BLAST: An Architecture for Realizing Very High Data Rates Over the Rich-scattering Wireless Channel," *Proc. IEEE ISSSE*-98, Pisa, Italy, September 1998, pp. 295–300, which are incorporated herein by reference. For the above two algorithms to work, the following condition must hold:

$$N_t < N_r. \quad (3)$$

The optimum algorithm for BLAST detection is maximum likelihood decoding (MLD). MLD obtains a diversity order equal to the number of receive antennas, independent of the number of transmit antennas. Hence, compared to other techniques, MLD has a significant signal-to-noise ratio advantage, and the SNR gain grows with the number of transmit antennas. One disadvantage of maximum likelihood decoding is that its complexity grows exponentially with the number of transmit antennas. Some simplifications can be made, however, to reduce the complexity at the cost of a reduced performance. Further reference is made to Richard van Nee, Allert van Zeist and Geert Awater, "Maximum Likelihood Decoding in a Space Division Multiplexing System," *IEEE VTC* 2000, Tokyo, Japan, May 2000, and Andrej Stefanov and Tolga M. Duman, "Turbo-coded Modulation for Systems with Transmit and Receive Antenna Diversity over Block Fading Channels: System Model, Decoding Approaches, and Practical Considerations," *IEEE J. Select. Areas Commun.*, vol. 19, pp. 958–968, May, 2001, which are incorporated herein by reference.

In the following discussion, assume that MLD is employed for BLAST. For the two transmit antennas case ($N_t=2$), assuming the same transmit power, there is a 3 dB SNR loss for BLAST comparing to STTD. In addition, the diversity loss for BLAST is in the order of $N_t$ times if the maximum likelihood detection algorithm is used. Meanwhile, since BLAST transmits $N_t$ independent data streams all the time, symbol throughput is doubled as compared to STTD. In order for BLAST to operate at the same bit error rate (BER) requirement, however, the modulation order of the QAM has to be reduced in order to compensate the SNR and diversity loss. This effectively reduces the BLAST throughput. As the number of transmit antennas increases, the diversity gain of STTD diminishes, but the throughput gain of BLAST remains linear to $N_t$.

By observing Equation (1), channel capacity is determined by two factors: $\rho$ (SNR) and HH* (channel matrix). Suppose $\lambda_i|_{i=1,\ldots,N_r}$ are the $N_r$ eigenvalues of HH*, then given the same $\rho$, the capacity increases as $$\prod_{i=1,\ldots,N_r} \lambda_i$$

increases. Notice that $\lambda_i$ carries the channel attenuation information, which is generally the SNR for each individual parallel eigen mode and is reflected in the measurement of the CQI 92 and impacts both STTD and BLAST. However, for a given CQI 92, the condition of scattered channels is determined by the distribution of $\lambda_i$.

The following outlines an exemplary way to determine CEI 98. For the [2T 2R] case as an example to explain what kind of channel matrix provides the maximum capacity to a BLAST system. If the channel matrix H is given as $$\begin{bmatrix} h_{11} & h_{21} \\ h_{12} & h_{22} \end{bmatrix},$$

then $$HH^* = \begin{bmatrix} |h_{11}|^2 + |h_{21}|^2 & h_{11}h_{12}^* + h_{21}h_{22}^* \\ h_{11}^*h_{12} + h_{21}^*h_{22} & |h_{12}|^2 + |h_{22}|^2 \end{bmatrix}. \quad (4)$$

Given the received signal strength as a constant, i.e. $|h_{11}|^2 + |h_{21}|^2 + |h_{12}|^2 + |h_{22}|^2 = c$, then to achieve maximum $\det(HH^*)$ the following relations should be followed:

$$|h_{11}|^2 + |h_{21}|^2 = |h_{12}|^2 + |h_{22}|^2 \quad (5)$$

$$[h_{11} \quad h_{21}] \begin{bmatrix} h_{12}^* \\ h_{22}^* \end{bmatrix} = 0.$$

The first equation indicates that the two receive antennas have equal signal strength, the second equation indicates that the channel vectors to each receive antenna are orthogonal to each other. For a two transmit antenna and two receive antenna (2T, 2R) case, the cond(HH*) is a distribution indicator of $\lambda_i$. In real-time application, calculating cond (HH*) directly is not feasible. To reduce the computing complexity, the following may be used:

$$\eta = \frac{\sum_{i,j} |\tilde{h}_{ij}|^2}{N_t^2 \det(HH^*)}$$

instead, where $\tilde{h}_{ij}$ is the i-th row j-th column elements of HH*. When calculating the average effects of $\eta$, its value may be clipped to a preset level. This is because $\eta$ is a ratio that can cover a very large range, hence the average value of $\eta$ that is dominated by some large $\eta$ values does not reflect its real effects. Note that the effect $\eta$ is non-linear. When $\eta$ reaches a certain threshold, further increases in $\eta$ does not affect much of the output. In one embodiment, $\eta$ is a measure of CEI and used as one criterion for selecting STC encoding (STTD/BLAST). Notably, CQI and CEI are two distinct measurements. CQI determines coding and modulation selection for both STTD and BLAST mode. Preferably, CEI does not affect STTD mode, and only indicates BLAST performance relative to STTD.

Those skilled in the art will recognize improvements and modifications to the preferred embodiments of the present invention. All such improvements and modifications are considered within the scope of the concepts disclosed herein and the claims that follow.

The invention claimed is:

1. A method comprising:
   receiving channel quality indicia from a receiver, the channel quality indicia bearing on a quality of channels used for transmissions to the receiver;
   determining a channel eigenvalue indicia (CEI), with a complex propagation matrix that reflects that receive antennas have equal signal strength and that channel vectors for the receive antennas are orthogonal to one another;
   selecting a space-time encoding mode from amongst a plurality of space-time encoding modes for transmitting data to the receiver based on the channel quality indicia and the CEI; and
   transmitting the data to the receiver using the selected space-time encoding mode via a plurality of transmit antennas.

2. The method of claim 1 further comprising selecting a modulation mode based on a receive diversity of the receiver and the channel quality indicia.

3. The method of claim 2 further comprising selecting a modulation mode based on the CEI when the receive diversity of the receiver is two.

4. The method of claim 2 wherein the receive diversity bears on the number of receive antennas used by the receiver.

5. The method of claim 2 further comprising receiving information bearing on the receive diversity of the receiver from the receiver.

6. The method of claim 2 further comprising selecting an error coding mode based on the receive diversity of the receiver and the channel quality indicia.

7. The method of claim 6 wherein data rates associated with transmissions increase as the channel quality indicia increases.

8. The method of claim 1 further comprising selecting an error coding mode based on the receive diversity of a receiver and the channel quality indicia.

9. The method of claim 1 further comprising selecting a modulation mode based on the CEI.

10. The method of claim 9 further comprising selecting an error coding mode based on the CEI.

11. The method of claim 1 wherein the selected space-time encoding mode is selected from a first mode wherein the data is transmitted from the plurality of transmit antennas in different formats and a second mode wherein different portions of the data are transmitted from different ones of the plurality of antennas.

12. The method of claim 11 wherein the first mode incorporates space-time transmit diversity encoding and the second mode incorporates BLAST encoding.

13. The method of claim 12 wherein the BLAST encoding is V-BLAST encoding.

14. The method of claim 1 wherein a complex propagation channel matrix H is given as $$\begin{bmatrix} h_{11} & h_{21} \\ h_{12} & h_{22} \end{bmatrix}$$

and the CEI satisfy the equations:

$$|h_{11}|^2 + |h_{21}|^2 = |h_{12}|^2 + |h_{22}|^2$$

and $$[h_{11} \quad h_{21}] \begin{bmatrix} h_{12}^* \\ h_{22}^* \end{bmatrix} = 0$$

15. The method of claim 1 wherein a complex propagation channel matrix H is given and the CEI is computed by determining cond(HH*).

16. A wireless communication device comprising:
receive circuitry for receiving information from a remote device;
transmit circuitry associated with a plurality of antennas and adapted to provide spatial diversity for transmissions to the remote device; and
processing circuitry associated with the receive circuitry and the transmit circuitry and adapted to:
receive channel quality indicia from the remote device, the channel quality indicia bearing on a quality of channels used for transmissions to the remote device;
determine channel eigenvalue indicia (CEI) with a complex propagation matrix that reflects that receive antennas have equal signal strength and that channel vectors for the receive antennas are orthogonal to one another;
select a space-time encoding mode from amongst a plurality of space-time encoding modes for transmitting data to the remote device based on the channel quality indicia and the CEI; and
effect transmission of the data to the remote device using the selected space-time encoding mode via a plurality of transmit antennas.

17. The wireless communication device of claim 16 wherein the processing circuitry is further adapted to select a modulation mode based on a receive diversity of the remote device and the channel quality indicia.

18. The wireless communication device of claim 17 wherein the processing circuitry is further adapted to select an error coding mode based on the receive diversity of the remote device and the channel quality indicia.

19. The wireless communication device of claim 18 wherein data rates associated with transmissions increase as the channel quality indicia increases.

20. The wireless communication device of claim 17 wherein the processing circuitry is further adapted to select a modulation mode based on the CEI when the receive diversity of the remote device is two.

21. The wireless communication device of claim 17 wherein the receive diversity bears on a number of receive antennas used by the remote device.

22. The wireless communication device of claim 17 wherein the processing circuitry is further adapted to receive information bearing on the receive diversity of the remote device from the remote device.

23. The wireless communication device of claim 16 wherein the processing circuitry is further adapted to select an error coding mode based on a receive diversity of the remote device and the channel quality indicia.

24. The wireless communication device of claim 16 wherein the processing circuitry is further adapted to select a modulation mode based on the CEI.

25. The wireless communication device of claim 24 wherein the processing circuitry is further adapted to select an error coding mode based on the CEI.

26. The wireless communication device of claim 16 wherein the selected space-time encoding mode is selected from a first mode wherein the data is transmitted from the plurality of antennas in different formats and a second mode wherein different portions of the data are transmitted from different ones of the plurality of antennas.

27. The wireless communication device of claim 26 wherein the first mode incorporates space-time transmit diversity encoding and the second mode incorporates BLAST encoding.

28. The wireless communication device of claim 27 wherein the BLAST encoding is V-BLAST encoding.

29. A wireless communication device comprising:
means for receiving channel quality indicia from a receiver, the channel quality indicia bearing on a quality of channels used for transmissions to the receiver;
means for determining channel eigenvalue indicia (CEI) with a complex propagation matrix that reflects that receive antennas have equal signal strength and that channel vectors for the receive antennas are orthogonal to one another;
means for selecting a space-time encoding mode from amongst a plurality of space-time encoding modes for transmitting data to the receiver based on the channel quality indicia and the CEI; and
means for transmitting the data to the receiver using the selected space-time encoding mode via a plurality of transmit antennas.

30. The wireless communication device of claim 29 further comprising means for selecting a modulation mode based on the a receive diversity of the receiver and the channel quality indicia.

31. The wireless communication device of claim 30 further comprising means for selecting an error coding mode based on the receive diversity of the receiver and the channel quality indicia.

32. The wireless communication device of claim 29 further comprising means for selecting an error coding mode based on the receive diversity of a receiver and the channel quality indicia.

33. The wireless communication device of claim 29 further comprising:
means for selecting a modulation mode based on the CEI and
means for selecting an error coding mode based on the CEI.

* * * * *